US011775059B2

(12) United States Patent
Zhang et al.

(10) Patent No.: US 11,775,059 B2
(45) Date of Patent: Oct. 3, 2023

(54) METHOD FOR DETERMINING HUMAN EYE CLOSE DEGREES, METHOD FOR CONTROLLING EYES, DEVICE, AND STORAGE MEDIUM

(71) Applicant: BIGO TECHNOLOGY PTE. LTD., Singapore (SG)

(72) Inventors: Feiqian Zhang, Guangzhou (CN); Gengdai Liu, Guangzhou (CN)

(73) Assignee: BIGO TECHNOLOGY PTE. LTD., Singapore (SG)

(*) Notice: Subject to any disclaimer, the term of this patent is extended or adjusted under 35 U.S.C. 154(b) by 0 days.

(21) Appl. No.: 17/625,947

(22) PCT Filed: Jun. 24, 2020

(86) PCT No.: PCT/CN2020/098066
§ 371 (c)(1),
(2) Date: Jan. 10, 2022

(87) PCT Pub. No.: WO2021/004285
PCT Pub. Date: Jan. 14, 2021

(65) Prior Publication Data
US 2022/0261070 A1    Aug. 18, 2022

(30) Foreign Application Priority Data

Jul. 10, 2019   (CN) .......................... 201910621637.5

(51) Int. Cl.
*G06T 13/40*   (2011.01)
*G06F 3/01*    (2006.01)
(Continued)

(52) U.S. Cl.
CPC .............. *G06F 3/013* (2013.01); *G06T 13/40* (2013.01); *G06T 13/80* (2013.01); *G06V 40/171* (2022.01); *G06V 40/193* (2022.01)

(58) Field of Classification Search
CPC .... G06F 3/013; G06V 40/171; G06V 40/193; G06T 13/40; G06T 13/80; G06T 19/20
See application file for complete search history.

(56) References Cited

U.S. PATENT DOCUMENTS

2004/0252865 A1*  12/2004  Tisse .................... G06V 40/19
                                                      382/209
2006/0082579 A1    4/2006  Yao
2009/0219405 A1*   9/2009  Kaneda ............... G06V 20/597
                                                      348/222.1

FOREIGN PATENT DOCUMENTS

CN    103279969 A    9/2013
CN    105139438 A   12/2015
(Continued)

OTHER PUBLICATIONS

International Search Report of the International Searching Authority for State Intellectual Property Office of the People's Republic of China in PCT application No. PCT/CN2020/098066 dated Sep. 24, 2020, which is an International application corresponding to this U.S. application.

(Continued)

*Primary Examiner* — Antonio A Caschera
(74) *Attorney, Agent, or Firm* — Kolitch Romano Dascenzo Gates LLC

(57) ABSTRACT

A method for determining human eye close degrees includes: acquiring a face image; determining a human eye open amplitude and a reference distance in the face image; calculating a relative amplitude of the human eye open amplitude relative to the reference distance; acquiring a maximum relative amplitude; and calculating a human eye close weight in the face image based on the relative amplitude and the maximum relative amplitude, the human eye close weight being configured to measure a human eye close degree.

15 Claims, 7 Drawing Sheets

(51) Int. Cl.
*G06V 40/16* (2022.01)
*G06V 40/18* (2022.01)
*G06T 13/80* (2011.01)

(56) References Cited

FOREIGN PATENT DOCUMENTS

CN 106446822 A 2/2017
CN 110363135 A 10/2019

OTHER PUBLICATIONS

The State Intellectual Property Office of People's Republic of China, First Office Action in Patent Application No. 201910621637.5 dated Jan. 4, 2021, which is a foreign counterpart application corresponding to this U.S. Patent Application, to which this application claims priority.

The State Intellectual Property Office of People's Republic of China, Second Office Action in Patent Application No. 201910621637.5 dated Mar. 23, 2021, which is a foreign counterpart application corresponding to this U.S. Patent Application, to which this application claims priority.

Nagano, Koki et al.; "paGAN:Real-time Avatars Using Dynamic Textures";ACM Transactions on Graphics, vol. 37, No. 6, Article 258; SIGGRAPH Asia Nov. 2018.

Ren, Anhu et al.; "Eye Blinking Detecting in Face Recognition Based on Adaboost"; Computer & Digital Engineering, vol. 44 No. 3, 2016.

Itewari, Ayush et al.; "MoFA: Model-based Deep Convolutional Face Autoencoder for Unsupervised Monocular Reconstruction", 2017 IEEE International Conference on Computer Vision (ICCV); 2017.

* cited by examiner

METHOD FOR DETERMINING HUMAN EYE CLOSE DEGREES, METHOD FOR CONTROLLING EYES, DEVICE, AND STORAGE MEDIUM

CROSS-REFERENCE TO RELATED APPLICATION

This application is a national phase application based on PCT/CN2020/098066, filed on Jun. 24, 2020, which claims priority to the Chinese Patent Application No. 201910621637.5, filed to the China National Intellectual Property Administration (CNIPA) on Jul. 10, 2019, the disclosures of which are incorporated herein by reference in their entireties.

TECHNICAL FIELD

The present disclosure relates to the field of image processing technologies, and in particular relates to a method for determining human eye close degrees, a method for controlling eyes, a device and a storage medium.

BACKGROUND

With the increasing popularity of smart terminals, entertainment applications such as selfie, short video, and live streaming have been extensively used. In the process of using these entertainment applications, controlling the relevant applications by photographer's eye movements is becoming more and more popular.

As one of the eye movements, blinks may be configured to control face models to blink, and trigger relevant instructions to perform corresponding operations.

SUMMARY

Embodiments of the present disclosure provide a method for determining human eye close degrees, a method for controlling eyes, and a device and a storage medium.

The embodiments of the present disclosure provide a method for determining human eye close degrees. The method includes:
  acquiring a face image;
  determining a human eye open amplitude and a reference distance in the face image;
  calculating a relative amplitude of the human eye open amplitude relative to the reference distance:
  acquiring a maximum relative amplitude; and
  calculating a human eye close weight in the face image based on the relative amplitude and the maximum relative amplitude, wherein the human eye close weight is configured to measure a human eye close degree.

The embodiments of the present disclosure further provide a method for controlling eyes. The method includes:
  acquiring a face image and a face model;
  acquiring a human eye close weight in the face image, wherein the human eye close weight is configured to measure a human eye close degree; and
  controlling an eye in the face model based on the human eye close weight;
  wherein the eye close weight is determined by the method for determining human eye close degrees according to any one of the embodiments of the present disclosure.

The embodiments of the present disclosure further provide a method for controlling eyes.

The method includes:
  playing video data including a plurality of frames of image data, wherein the image data includes a face image;
  displaying a face model to cover the face image;
  determining a human eye open amplitude and a reference distance in the face image of each of the frames;
  calculating a relative amplitude of the human eye open amplitude relative to the reference distance;
  acquiring a maximum relative amplitude;
  calculating a human eye close weight in the face image based on the relative amplitude and the maximum relative amplitude; and
  driving, based on the human eye close weight, an eye in the face model to blink.

The embodiments of the present disclosure further provide an apparatus for determining human eye close degrees. The apparatus includes:
  a face image acquiring module, configured to acquire a face image;
  a face data determining module, configured to determine a human eye open amplitude and a reference distance in the face image;
  a relative amplitude calculating module, configured to calculate a relative amplitude of the human eye open amplitude relative to the reference distance;
  a maximum relative amplitude acquiring module, configured to acquire a maximum relative amplitude; and
  a human eye close weight calculating module, configured to calculate a human eye close weight in the face image based on the relative amplitude and the maximum relative amplitude, the human eye close weight is configured to measure a human eye close degree.

The embodiments of the present disclosure further provide an apparatus for controlling eyes. The apparatus includes:
  a face image and face model acquiring module, configured to acquire a face image and a face model;
  a human eye close weight acquiring module, configured to acquire a human eye close weight in the face image, wherein the human eye close weight is configured to measure a human eye close degree; and
  an eye controlling module, configured to control an eye in the face model based on the human eye close weight;
  wherein the human eye close weight is determined by the apparatus for determining human eye close degrees according to any one of the embodiments of the present disclosure.

The embodiments of the present disclosure further provide an apparatus for controlling eyes. The apparatus includes:
  a playing module, configured to play video data including a plurality of frames of image data, wherein the image data includes a face image;
  a face model displaying module, configured to display a face model to cover the face image;
  a face data determining module, configured to determine a human eye open amplitude and a reference distance in the face image of each of the frames;
  a relative amplitude calculating module, configured to calculate a relative amplitude of the human eye open amplitude relative to the reference distance:
  a maximum relative amplitude acquiring module, configured to acquire a maximum relative amplitude;
  a human eye close weight calculating module, configured to calculate a human eye close weight in the face image based on the relative amplitude and the maximum relative amplitude; and
  a model driving module, configured to drive, based on the human eye close weight, an eye in the face model to blink.

The embodiments of the present disclosure further provide a device. The device includes:

at least one processor; and a storage device storing at least one program therein;

wherein the at least one program, when run by the at least one processor, causes the at least one processor to perform the method for determining human eye close degrees and/or the method for controlling eyes according to any one of the embodiments of the present disclosure.

The embodiments of the present disclosure further provide a computer-readable storage medium storing a computer program therein, wherein the computer program, when run by a processor, causes the processor to perform the method for determining human eye close degrees and/or the method for controlling eyes according to any one of the embodiments of the present disclosure.

DETAILED DESCRIPTION

Figure 1:
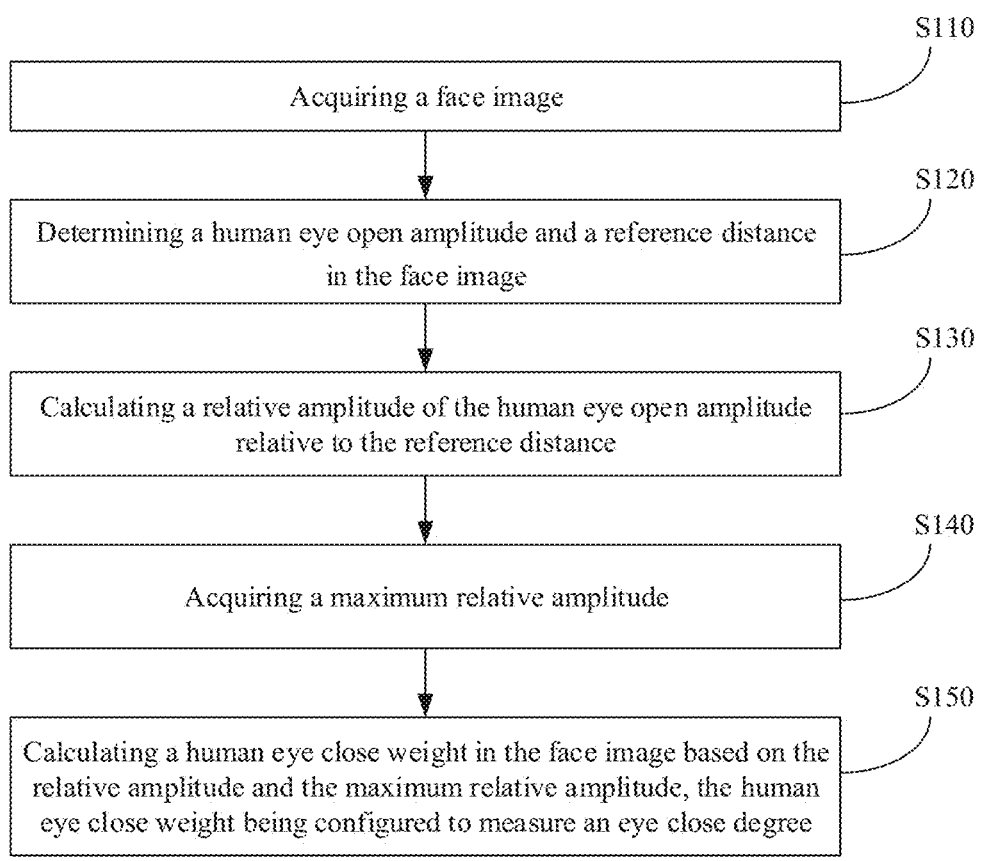
FIG. 1 is a flow chart of a method for determining human eye close degrees according to a first embodiment of the present disclosure.

The present disclosure will be described below with reference to the accompany drawings and the embodiments. The embodiments described herein are merely intended to explain the present disclosure, but not to limit the present disclosure. For the ease of description, some but not all structures relevant to the present disclosure are shown in the drawings.

In the related art, one approach to detect blinks is to identify the blinks, that is, to identify states of two nodes of eye open and eye close to determine whether blinks occur. In another approach, the blinking on a face may also be detected by detecting and tracking facial expressions in video data and migrating the facial expressions to different faces. Although the above two approaches may be used for blink detection, a human eye close degrees in the process of blinking is not measured, such that the blink detection is not applicable to scenarios where the relevant applications are controlled based on the human eye close degree.

First Embodiment

FIG. 1 is a flow chart of a method for determining human eye close degrees according to a first embodiment of the present disclosure. This embodiment may be applicable to the case of determining human eye close degrees. The method may be performed by an apparatus for determining human eye close degrees. The apparatus may be practiced by means of software and/or hardware and integrated into a device for performing the method. As shown in FIG. 1, the method may include the following processes.

In S110, a face image is acquired.

In the embodiment of the present disclosure, the face image may be a user's face image captured by a camera in the case that a user takes a selfie, shoots a short video or performs a live broadcast by a terminal provided with the camera. For example, in the case that the user takes a selfie, the camera captures an image in real time and a display screen of the terminal displays a preview image. In this way, the user's face image in the current preview image may be acquired. Alternatively, in the case that the user shoots a short video or performs a live broadcast, the user's face image in a current video frame of video data may be acquired. The face image may also be a face image pre-stored in the terminal, or a face image in a video frame in the case that the video data is played. A method for acquiring the face image is not limited in the embodiment of the present disclosure.

In S120, a human eye open amplitude and a reference distance in the face image are determined.

Face key points may be acquired by performing a face key point detection on the face image in the case that the face image is acquired, human eye key points and reference key points are identified from the face key points, and then the human eye open amplitude is determined based on the human eye key points. The human eye open amplitude represents a human eye open amplitude in a human eye image. The reference key points may be key points of relatively constant facial features on a face. For example, since the nose remains unchanged on the face, nose key points may be used as the reference key points to calculate the reference distance. For example, the distance between a nose top point and a nose tip point may be calculated as the reference distance. The reference key points may also be key points of corners of the left eye and the right eye on the face. In this case, the distance between the corners of the left eye and the right eyes is the reference distance. Those skilled in the art may select a distance between any two relatively constant points on the face as the reference distance in the case of implementing the embodiment of the present disclosure, which is not limited in the embodiment of the present disclosure.

In S130, a relative amplitude of the human eye open amplitude relative to the reference distance is calculated.

A ratio of the human eye open amplitude to the reference distance may be calculated, and the ratio may be determined as the relative amplitude of the human eye open amplitude relative to the reference distance. That is, in the case that the reference distance is taken as a reference, a human eye open amplitude in the face image may be measured by the relative amplitude.

In S140, a maximum relative amplitude is acquired.

The maximum relative amplitude may be a relative amplitude of the human eye open amplitude relative to the reference distance in the case that the human eye open amplitude is a maximum value. That is, the relative amplitude of the human eye open amplitude relative to the reference distance in the case that the human eye is opened to a maximum extent. A plurality of face images of a same face may be acquired. Then a plurality of relative amplitudes may be acquired by calculating relative amplitudes based on the plurality of face images.

Further, a maximum value among the plurality of relative amplitudes is determined as the maximum relative amplitude. Alternatively, the maximum relative amplitude may be estimated in the case that the width of the human eye is calculated. Alternatively, the maximum relative amplitude is set according to experience, or by other methods. The method for acquiring the maximum relative amplitude is not limited in the embodiment of the present disclosure.

In S150, a human eye close weight in the face image is calculated based on the relative amplitude and the maximum relative amplitude, wherein the human eye close weight is configured to measure a human eye close degree.

In some embodiments, the human eye close amplitude in the face image may be calculated first. The eye close amplitude may be a ratio of the human eye open amplitude in a specific state in the process of blinking to the human eye open amplitude in the case that the eye is fully opened. In the embodiment of present disclosure, since both of the relative amplitude and the maximum relative amplitude are ratios relative to the reference distance, the eye close amplitude may be a ratio of the relative amplitude to the maximum relative amplitude.

The human eye close weight may be calculated based on the eye close amplitude in the case that the eye close amplitude is acquired. In the embodiment of the present disclosure, the human eye close weight is positively correlated with the eye close amplitude, and represents the human eye close degree in the face image. The more the eye tends to be a fully closed state, the smaller the eye close amplitude is, and the greater the human eye close weight is.

Relevant applications may be controlled in the case that the human eye close weight is determined. For example, an eye of a virtual face model may be controlled based on the human eye close weight of the face image, such that the face model may blink with blinking on the face. Alternatively, instructions are triggered to perform corresponding operations based on the human eye close weight in the face image in the case that the human eye close weight is greater than a predetermined value. The application of the human eye close weight is not limited in the embodiment of the present disclosure.

According to the embodiment of the present disclosure, the relative amplitude is determined based on the human eye open amplitude and the reference distance. Then the human eye close weight is calculated based on the relative amplitude and the maximum relative amplitude, such that the human eye close degree is measured. In this way, the problem that the human eye close degree fails not be measured by eye detection is solved. In the case that the human eye close weight is used for controlling the relevant applications, the relevant applications can be controlled based on the human eye close degree, such that eye detection is applicable for the scenario where the relevant applications are controlled based on the human eye close degree.

Second Embodiment

Figure 2A:
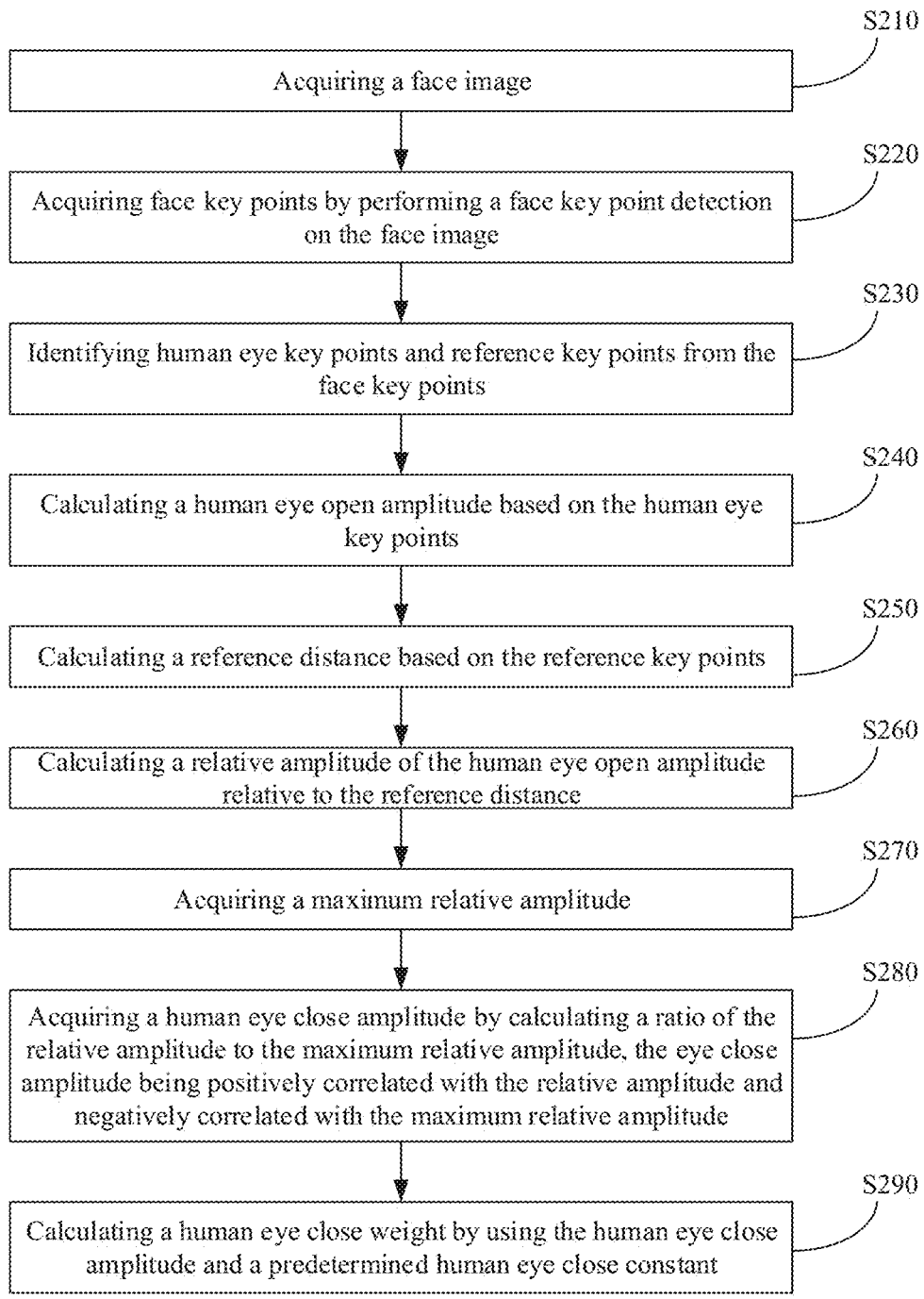
FIG. 2A is a flow chart of a method for determining human eye close degrees according to a second embodiment of the present disclosure.

FIG. 2A is a flow chart of a method for determining human eye close degrees according to a second embodiment of the present disclosure. This embodiment is described based on Embodiment 1. As shown in FIG. 2A, the method may include the following processes.

In S210, a face image is acquired.

In S220, face key points are acquired by performing a face key point detection on the face image.

The face key point detection, also known as face key point location or face alignment, refers to locating key areas of a face based on a given face image, wherein the key areas include eyebrows, eyes, nose, mouth, facial contour, or the like.

The face key points may be extracted by a pre-trained face key point detecting model. For example, a large number of face images may be captured and marked with key points to form training data. The face key points of the face image may be acquired by inputting the face image into the trained face key point detecting model in the case that the model is trained by the training data.

Figure 2B:
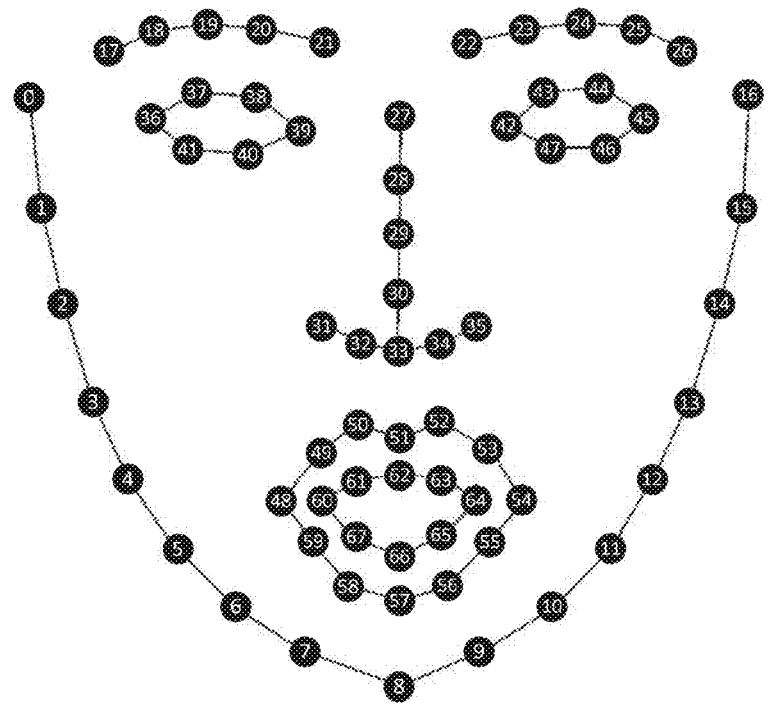
FIG. 2B is a schematic diagram of face key points according to an embodiment of the present disclosure.

FIG. 2B is a schematic diagram of face key points. As shown in FIG. 2B, for a face image, key points of facial contour (point 0 to point 16), key points of left and right eyebrows (point 17 to point 26), key points of nose (point 27 to point 35), key points of left and right eyes (point 36 to point 47) and key points of mouth (point 48 to point 59) may be extracted from the face image.

FIG. 2B is an example of the face key points. In practice, key points of other face areas, such as cheekbones and ears, may also be added. Neither the locations nor the number of the face key points is limited in the embodiment of the present disclosure.

In S230, human eye key points and reference key points are identified from the face key points.

In an embodiment of the present disclosure, eye key points may be identified from the face key points, and eye top key points and eye bottom key points may be selected from the eye key points as the human eye key points. Nose key points may also be identified from the face key points, and a nose top key point and a nose tip key point may be selected from the nose key points as the reference key points.

As shown in FIG. 2B, it can be determined that in all the face key points, point 42 to point 47 are left eye key points, point 36 to point 41 are right eye key points, and point 27 to point 35 are nose key points. An eye top key point 44 and eye bottom key point 46 are selected as the human eye key points of the left eye. An eye top key point 37 and an eye bottom key point 41 are selected as the human eye key points of the right eye. In addition, a nose top key point 27 and a nose tip key point 33 may be selected as the reference key points.

In S240, a human eye open amplitude is calculated based on the human eye key points.

In the embodiment of the present disclosure, for the face image i, the human eye open amplitude represents an open degree of the human eye. That is, it may be a distance between an upper eyelid top point and a lower eyelid bottom point. Corresponding to the face key points, the distance between the eye top key point and the eye bottom key point may be calculated as the human eye open amplitude.

As shown in FIG. 2B, the human eye open amplitude of the left eye is the distance between the point 44 and the point 46, i.e., $\|p_{44,i} - p_{46,i}\|$. The human eye open amplitude of the right eye is the distance between the point 37 and the point 41, i.e., $\|p_{37,i} - p_{41,i}\|$.

In S250, a reference distance is calculated based on the reference key points.

As shown in FIG. 2B, in the embodiment of the present disclosure, in the case that the nose top key point 27 and the nose tip key point 33 are determined as the reference points, the distance between the nose top key point and the nose tip key point may be calculated as the reference distance. That is, the reference distance is the distance $\|p_{27,i}-p_{33,i}\|$ between the point 27 and the point 33.

In the embodiment of the present disclosure, since it is convenient to detect the nose top key point and the nose tip key point regardless of whether the face is towards front or side, the distance between the nose top and the nose tip is selected as the reference distance. Moreover, since the positions of the nose top and the nose tip are relatively constant, compared with calculation of the reference distance by using other key points as reference points, the accuracy of the reference distance can be improved. In this way, the accuracy of subsequent calculation of the human eye close weight can be further improved, such that accurate control of blinking is realized.

In S260, a relative amplitude of the human eye open amplitude relative to the reference distance is calculated.

In the embodiment of the present disclosure, the relative amplitude is a ratio of the human eye open amplitude to the reference distance and is calculated by the following equations:

$$r_{l,i} = \frac{\|p_{44,i} - p_{46,i}\|}{\|p_{27,i} - p_{33,i}\|}, r_{r,i} = \frac{\|p_{37,i} - p_{41,i}\|}{\|p_{27,i} - p_{33,i}\|}.$$

In the above equations, $r_{l,i}$ refers to a relative amplitude of the left eye, and $r_{r,i}$ is a relative amplitude of the right eye. It is known from the above two formulas that the reference distance $\|p_{27,i}-p_{33,i}\|$ is constant. Therefore, the relative amplitudes $r_{l,i}$ and $r_{r,i}$ depend on the human eye open amplitude, and the greater the human eye open amplitude is, the greater the relative amplitude is.

In S270, a maximum relative amplitude is acquired.

In practice, a plurality of relative amplitudes may be acquired based on a plurality of frames of the face image of a same face. Then a maximum value may be determined from the plurality of relative amplitudes as the maximum relative amplitude, i.e., $$\hat{r}_l = \max_{i \in F_n} r_{l,i}, \hat{r}_r = \max_{i \in F_n} r_{r,i}.$$

In the above equations, $\hat{r}_l$ is the maximum relative amplitude of the left eye, $\hat{r}_r$ is the maximum relative amplitude of the right eye, and $F_n$ is a set of n frames of the face image of a same face.

In S280, a human eye close amplitude is acquired by calculating a ratio of the relative amplitude to the maximum relative amplitude. The eye close amplitude is positively correlated with the relative amplitude, and negatively correlated with the maximum relative amplitude.

In the embodiment of the present disclosure, for a face image i, the eye close amplitude of the left eye is the ratio of the relative amplitude $r_{l,i}$ of the left eye to the maximum relative amplitude $\hat{r}_l$ of the left eye. That is, the eye close amplitude of the left eye is $$\frac{r_{l,i}}{\hat{r}_l}.$$

The eye close amplitude of the right eye is the ratio of the relative amplitude $r_{r,i}$ of the right eye to the maximum relative amplitude $\hat{r}_r$ of the right eye. That is, the eye close amplitude of the right eye is $$\frac{r_{r,i}}{\hat{r}_r}.$$

The eye close amplitudes of both the left eye and the right eye are positively correlated with the relative amplitude, and negatively correlated with the maximum relative amplitude. The greater the relative amplitude is, the greater the eye close amplitude is, and the smaller the human eye close degree is. In the case that the eye close amplitude is approximate to 1, it means that the human eye is in a fully opened state. In the case that the eye close amplitude is approximate to 0, it means that the human eye is in a fully closed state.

In S290, a human eye close weight is calculated by using the eye close amplitude and a predetermined human eye close constant.

In practice, there may be errors in the image capturing and the key point detection of the face image, such that the eye top key point and the eye bottom key point may not completely coincide in the case that the human eyes are fully closed. A human eye close constant α may be set, for example, the human eye close constant α may be 0.3. In the case that the human eye close amplitude of the left eye $$\frac{r_{l,i}}{\hat{r}_l} < \alpha,$$

it is considered that the left eye is fully closed. In the case that the human eye close amplitude of the right eye $$\frac{r_{r,i}}{\hat{r}_r} < \alpha,$$

it is considered that the right eye is fully closed.

In an embodiment of the present disclosure, the human eye close weight on the face image may be calculated by the following equations:

$$w_{l,i} = \frac{1}{(1-\alpha)^2}\left(\frac{r_{l,i}}{\hat{r}_l} - 1\right)^2, w_{r,i} = \frac{1}{(1-\alpha)^2}\left(\frac{r_{r,i}}{\hat{r}_r} - 1\right)^2.$$

In the above equations, $w_{l,i}$ is the human eye close weight of the left eye, and $w_{r,i}$ is the human eye close weight of the right eye. It can be known from the above formulas that, by taking the left eye as an example, the more the left eye is closed, the smaller the relative amplitude $r_{l,i}$ of the left eye is, the smaller the human eye close amplitude $$\frac{r_{l,i}}{\hat{r}_l}$$

of the left eye is, and the greater the human eye close weight $w_{l,i}$ of the left eye is.

According to the embodiment of the present disclosure, the face key points are acquired by performing a face key point detection on the face. Then the human eye open amplitude in the face image is calculated based on the eye top key point and the eye bottom key point in the face key points. Moreover, the reference distance is calculated based on the nose top key point and the nose tip key point, so as to determine the relative amplitude based on the human eye open amplitude and the reference distance. The human eye close weight is calculated based on the relative amplitude and the maximum relative amplitude. In this way, the problem that the human eye close degree can not be measured by eye detection is solved. In the case that the human eye close weight is used for controlling the relevant applications, the relevant applications can be controlled based on the human eye close degree, such that eye detection is applicable for the scenario where the relevant applications are controlled based on the human eye close degree.

In the embodiment of the present disclosure, since it is convenient to detect the nose top key point and the nose tip key point regardless of whether the face is towards front or side, the distance between the nose top and the nose tip is selected as the reference distance. Moreover, since the positions of the nose top and the nose tip are relatively constant, compared with calculation of the reference distance by using other key points as reference points, the accuracy of the reference distance can be improved. In this way, the accuracy of the human eye close weight can be improved.

Third Embodiment

Figure 3:
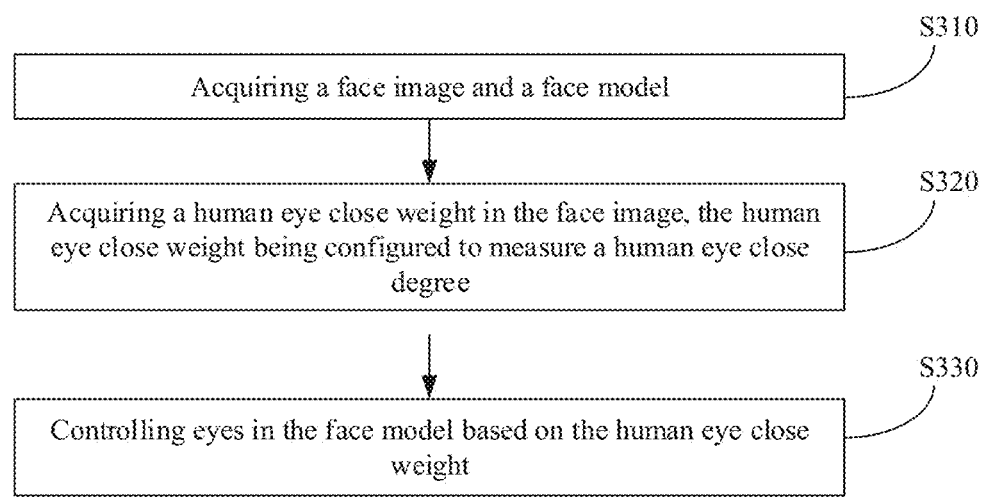
FIG. 3 is a flow chart of a method for controlling eyes according to a third embodiment of the present disclosure.

FIG. 3 is a flow chart of a method for controlling eyes according to a third embodiment of the present disclosure. This embodiment may be applicable to the scenario where human eyes in a face image are controlled according to human eyes in a face image. The method may be performed by an apparatus for controlling eyes. The apparatus may be practiced by means of software and/or hardware, and integrated into a device for performing the method. As shown in FIG. 3, the method may include the following processes.

In S310, a face image and a face model are acquired.

In the embodiment of the present disclosure, the face image may be a user's face image captured by a camera in the case that a user takes a selfie, shoots a short video or performs a live broadcast by a terminal provided with the camera. For example, in the case that the user takes a selfie, the camera captures an image in real time and a display screen of the terminal displays a preview image. In this way, the user's face image in the current preview image may be acquired. Alternatively, in the case that the user shoots a short video or performs a live broadcast, the user's face image in the current video frame of video data may be acquired. The face image may also be a face image pre-stored in the terminal, or a face image in a video frame in the case that video data is played. A method for acquiring the face image is not limited in the embodiment of the present disclosure.

The face model may be a sticker model or other types of models. In some embodiments, the face model may be a face model selected by the user. For example, applications such as selfie, short video and live broadcast provide various face models for the user to choose. In the case that the user performs a selection operation on the given face models, a corresponding face model may be acquired according to the user's selection operation. The face model may be a human face model, an animal face model, a cartoon face model, or the like. The face model is configured to control an eye on the face model based on a human eye close weight in the face image. The face model of which the eye is adjusted may be covered on the face image in a selfie preview, a short video or a live broadcast in the form of a sticker, such that a sticker effect is realized.

In S320, a human eye close weight in the face image is acquired, wherein the human eye close weight is configured to measure a human eye close degree.

In the embodiment of the present disclosure, the method for acquiring the human eye close weight may be found with reference to Embodiment 1 or Embodiment 2, which is not described in detail herein.

In S330, an eye in the face model is controlled based on the human eye close weight.

In an embodiment of the present disclosure, a predetermined human eye open amplitude in the face model may be acquired first. Then a target human eye open amplitude may be calculated based on the human eye close weight and the predetermined human eye open amplitude. The human eye open amplitude in the face model may be adjusted to the target human eye open amplitude, such that control of the eye in the face model is completed.

In practice, the eye in the face model is initially in a fully opened state. The predetermined human eye open amplitude is a human eye open amplitude in the case that the eye in the face model is fully opened. For one face model, model parameters of the model may be stored in advance, wherein the model parameters include the human eye open amplitude in the case that the eye is fully opened, the distance between a nose top and a nose tip, or the like, such that the predetermined human eye open amplitude may be read from the model parameters.

A product of the human eye close weight and the predetermined human eye open amplitude may be calculated as the target human eye open amplitude in the case that the predetermined human eye open amplitude is acquired. For example, in the case that the predetermined human eye open amplitude in the initial model is the distance between an eye top point and an eye bottom point in the case that the eye is opened to the maximum extent and the human eye close weight is 0.5, the target human eye open amplitude is half of the predetermined human eye open amplitude.

In an embodiment of the present disclosure, it can be known from the calculation formula of the human eye close weight that the smaller the human eye close amplitude $$\frac{r_{l,i}}{\hat{r}_l} \text{ or } \frac{r_{r,i}}{\hat{r}_r}$$

is, the smaller $r_{r,i}$ or $r_{l,i}$ is. The smaller the distance between the eye top key point and the eye bottom key point is, the more the eye is closed, and the greater the human eye close weight is. In the case that the human eye close weight is greater than a predetermined value, it is determined that the target human eye open amplitude is 0, that is, the eye is fully closed.

The face model may include a first initial face model and a second initial face model, wherein the first initial face model is a face model in which the eyes are fully opened, and the second initial face model is a face model in which the eyes are fully closed. In this way, the target human eye open amplitude may be acquired by interpolation calculation based on the human eye close weight with reference to the first initial face model and the second initial face model.

The eyes in the face model may be adjusted based on the target human eye open amplitude in the case that the target human eye open amplitude is acquired, such that the human eye open amplitude is equal to the target human eye open amplitude. For example, control of an eye in the face model is completed by adjusting the positions of the upper eyelids of the eyes in the face model, or by acquiring the adjusted face model by driving, based on the target human eye open amplitude, the face model to deform.

In practice, the adjusted face model may be acquired by adjusting the eye in the face model based on one frame of the face image. A plurality of frames of continuous face images may be acquired in the case that the plurality of continuous video frames are displayed during selfie previewing, short video shooting or live broadcast. In the case that the eyes in the face in a video blink, the eyes in the face model may be adjusted in real time by a plurality of frames of face images, such that the face model may simulate blinking.

According to the embodiment of the present disclosure, the human eye close weight in the face image is acquired in the case that the face image and the face model are acquired. The human eye close weight is configured to measure a human eye close degree. Then the eye in the face model is controlled based on the human eye close weight. In this way, the method of the present disclosure solves the problem that the human eye close degree cannot be measured by eye detection. In the case that the human eye close weight is used for controlling the eye in the face model, the eye of the face model may be controlled based on the human eye close degree, such that the face model may simulate real blinking on the face and the face model represents more realistic expressions. Moreover, a large number of face images are not needed, and the practice is relatively simple.

Fourth Embodiment

Figure 4A:
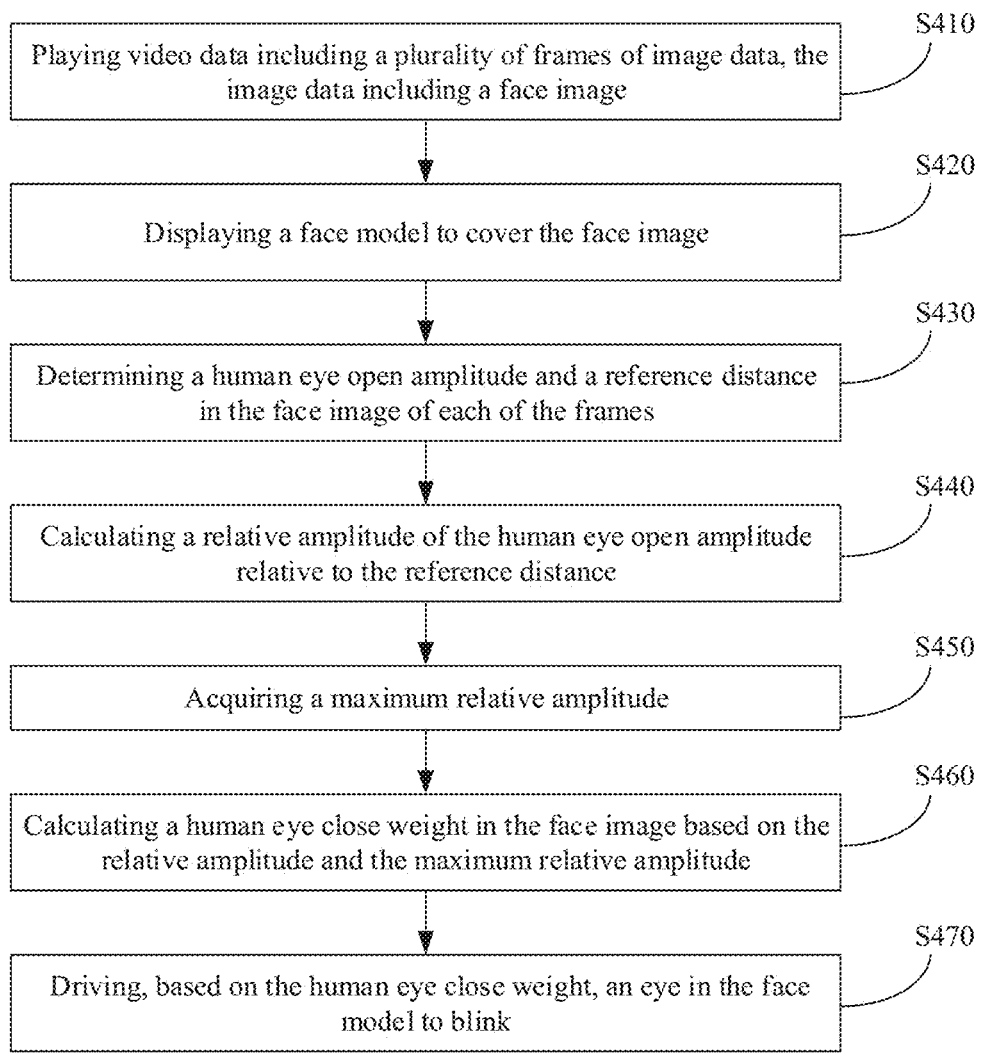
FIG. 4A is a flow chart of a method for controlling eyes according to a fourth embodiment of the present disclosure.

FIG. 4A is a flow chart of a method for controlling eyes according to a fourth embodiment of the present disclosure. This embodiment may be applicable to the case where a face model is controlled to blink according to a face image in video data in the case that the video data is played. The method may be performed by an apparatus for controlling eyes. The apparatus may be practiced by means of software and/or hardware and integrated into a device for performing the method. As shown in FIG. 4A, the method may include the following processes.

In S410, video data including a plurality of frames of image data is played, wherein the image data includes a face image.

In the embodiment of the present disclosure, the video data may be preview video data, short video data or live broadcast video data formed in response to capturing an image in the case that a user takes a selfie. The video data includes a plurality of frames of image data, and the image data includes a face image.

In S420, a face model is displayed to cover the face image.

The face model may be an expression model selected by the user in selfie taking, short video shooting or live broadcast. The face model is configured to cover the face image displayed in a video playback interface in the case that the video data is played. Moreover, the face model simulates blinking under the drive of a human eye in the face image. For example, the face model covers the face image in the form of a sticker, so as to simulate blinking under the drive of the face image.

Figure 4B:
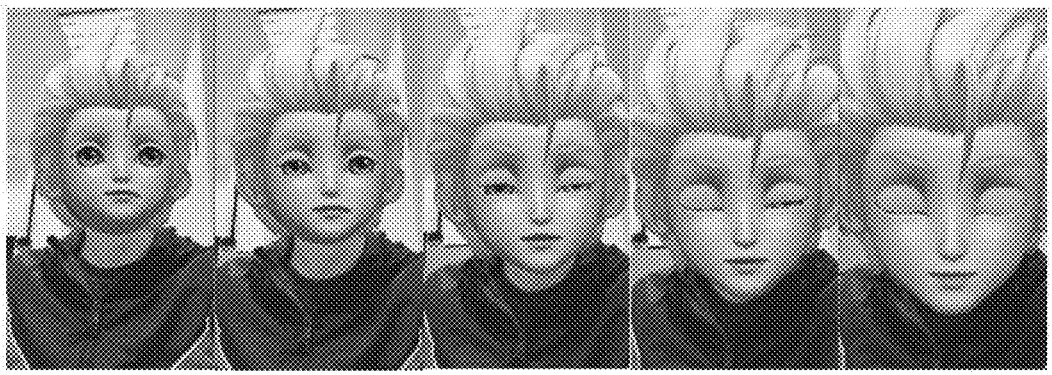
FIG. 4B is a schematic diagram of a blinking effect of a face model according to an embodiment of the present disclosure.

As shown in FIG. 4B, in the case that the video data is played, a cartoon face model is used to cover a user's face image in a video.

In S430, a human eye open amplitude and a reference distance in the face image of each of the frames are determined.

For each frame of the face image, face key points may be acquired by performing a face key point detection on the face image. Then human eye key points and reference key points are identified from the face key points. Further, the human eye open amplitude is determined based on the human eye key points. The human eye open amplitude represents a human eye open amplitude in a human eye image. The reference key points may be key points of relatively constant facial features on a face. For example, since the nose remains unchanged on the face, key points of the nose may be used as the reference key points to calculate the reference distance. In some embodiments, the distance between a nose top and a nose tip may be calculated as the reference distance. The reference key points may also be key points of corners of the left eye and the right eye on the face, and the distance between the corners of the left eye and the right eye is determined as the reference distance. Those skilled in the art can select a distance between any two relatively constant points on the face as the reference distance in the case of implementing the embodiment of the present disclosure, which is not limited in the embodiment of the present disclosure.

In S440, a relative amplitude of the human eye open amplitude relative to the reference distance is calculated.

A ratio of the human eye open amplitude to the reference distance may be calculated and determined as the relative amplitude of the human eye open amplitude relative to the reference distance. That is, in the case that the reference distance is taken as a reference, the human eye open amplitude in the face image may be measured by the relative amplitude.

In S450, a maximum relative amplitude is acquired.

In the embodiment of the present disclosure, in the case that the video data is played frame by frame, the relative amplitudes of the human eye open amplitudes relative to the reference distance in the plurality of frames of face images may be acquired. Then a maximum value is identified from the plurality of relative amplitudes and determined as the maximum relative amplitude. For example, for the current frame of image data, N continuous frames of image data adjacent to the current frame may be acquired. A plurality of relative amplitudes are acquired by calculating one relative amplitude for each face image in the N frames of image data. The maximum value of the plurality of relative amplitudes is selected as the maximum relative amplitude.

In S460, a human eye close weight in the face image is calculated based on the relative amplitude and the maximum relative amplitude.

In some embodiments, the human eye close amplitude in the face image may be calculated first. The human eye close amplitude may be a ratio of the human eye open amplitude in a specific state in the process of blinking to the human eye open amplitude in the case that the eye is fully opened. In the embodiment of present disclosure, since both of the relative amplitude and the maximum relative amplitude are ratios relative to the reference distance, the human eye close amplitude may be a ratio of the relative amplitude to the maximum relative amplitude. The human eye close amplitude represents the human eye close degree in a specific state in the process of blinking, and is smaller than or equal to 1.

The human eye close weight may be calculated based on the human eye close amplitude in the case that the human eye close amplitude is acquired. In the embodiment of the present disclosure, the human eye close weight is positively correlated with the human eye close amplitude, and represents the human eye close degree at a specific moment of blinking in the face model in the case that the human eye in the face image is used for controlling the face model to blink.

In S470, an eye in the face model is driven to blink based on the human eye close weight.

Blink control is performed on the displayed face model based on the face image in each frame of video data with the playing of the video data. For example, a plurality of frames of face images that are continuous in time may be acquired. Then one human eye close weight of each frame of face image is determined. In this way, the face model displayed in a playback interface may be driven to blink based on the human eye close weight.

FIG. 4B shows a process and effect of controlling the face model to blink based on the face image in the video data. In FIG. 4B, in the case that the eye in the face image in the video data blinks, the face model covered on the face image simulates blinking with the face image.

In the embodiment of the present disclosure, in the case that the video data is played and the face model is displayed, the human eye close weight in the face image may be calculated by the face image in the video data, such that the displayed face model may be driven to blink based on the human eye close weight. In this way, the problem that the human eye close degree fails to be measured by eye detection is solved. The face model can be driven by the human eye close degree in the blinking process to simulate blinking, such that the face model may simulate real blinking on the face. Further, the face model includes more realistic expressions. Moreover, there is no need for a large number of face images, and its implementation is relatively simple, the calculation is faster and a smoother blinking effect can be acquired.

Fifth Embodiment

Figure 5:
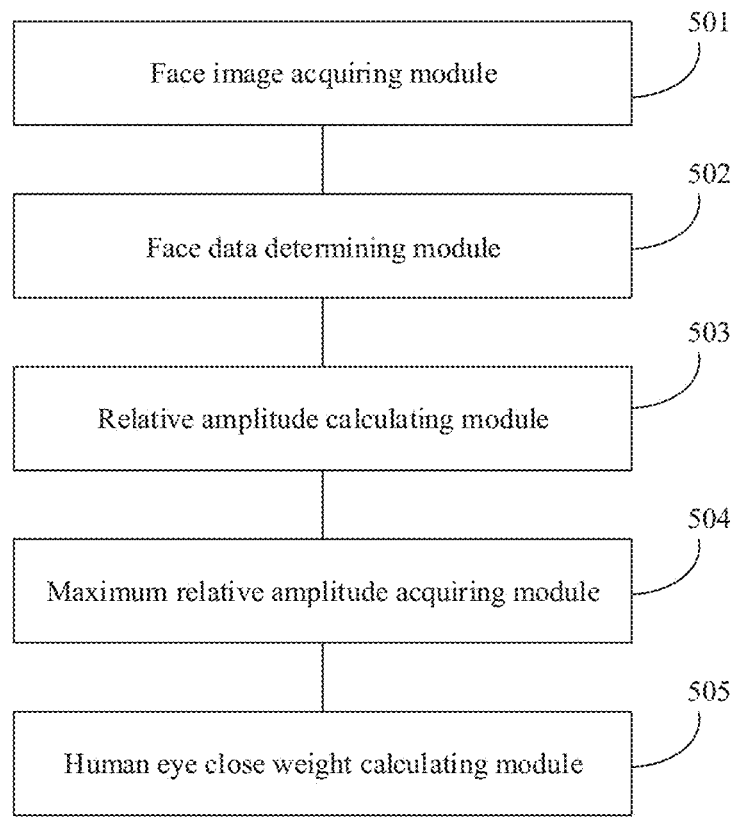
FIG. 5 is a structural block diagram of an apparatus for determining human eye close degrees according to a fifth embodiment of the present disclosure.

FIG. 5 is a structural block diagram of an apparatus for determining human eye close degrees according to a fifth embodiment of the present disclosure. The apparatus may specifically include: a face image acquiring module 501, configured to acquire a face image; a face data determining module 502, configured to determine a human eye open amplitude and a reference distance in the face image; a relative amplitude calculating module 503, configured to calculate a relative amplitude of the human eye open amplitude relative to the reference distance; a maximum relative amplitude acquiring module 504, configured to acquire a maximum relative amplitude; and a human eye close weight calculating module 505, configured to calculate a human eye close weight in the face image based on the relative amplitude and the maximum relative amplitude, wherein the human eye close weight is configured to measure a human eye close degree.

In some embodiments, the face data determining module 502 includes: a face key point detecting sub-module, configured to acquire face key points by performing a face key point detection on the face image; a human eye key point and reference key point determining sub-module, configured to identify human eye key points and reference key points from the face key points; a human eye open amplitude calculating sub-module, configured to calculate a human eye open amplitude based on the human eye key points; and a reference distance calculating sub-module, configured to calculate a reference distance based on the reference key points.

In some embodiments, the human eye key point and reference key point determining sub-module includes: an eye key point determining unit, configured to identify eye key points from the face key points; and a human eye key point selecting unit, configured to select an eye top key point and an eye bottom key point from the eye key points as human eye key points.

In some embodiments, the human eye key points include an eye top key point and an eye bottom key point. In this case, the human eye open amplitude calculating sub-module includes a first distance calculating unit. The first distance calculating unit is configured to calculate the distance between the eye top key point and the eye bottom key point, and determine the distance as a human eye open amplitude.

In some embodiments, the human eye key point and reference key point determining sub-module includes: a nose key point determining unit, configured to identify nose key points from the face key points; and a reference key point selecting unit, configured to select a nose top key point and a nose tip key point from the nose key points as the reference key points.

In some embodiments, the reference key points include a nose top key point and a nose tip key point. In this case, the reference distance calculating sub-module includes a second distance calculating unit. The second distance calculating unit is configured to calculate the distance between the nose top key point and the nose tip key point, and determine the distance as the reference distance.

In some embodiments, the human eye close weight calculating module 505 includes: a human eye close amplitude calculating sub-module, configured to acquire a human eye close amplitude by calculating a ratio of the relative amplitude to the maximum relative amplitude, wherein the human eye close amplitude is positively correlated with the relative amplitude and negatively correlated with the maximum relative amplitude; and a human eye close weight calculating sub-module, configured to calculate the human eye close weight by using the human eye close amplitude and a predetermined human eye close constant.

The apparatus for determining human eye close degrees according to the embodiment of the present disclosure may perform the method for determining human eye close degrees according to any embodiment of the present disclosure, and is provided with corresponding functional modules for performing the method.

Sixth Embodiment

Figure 6:
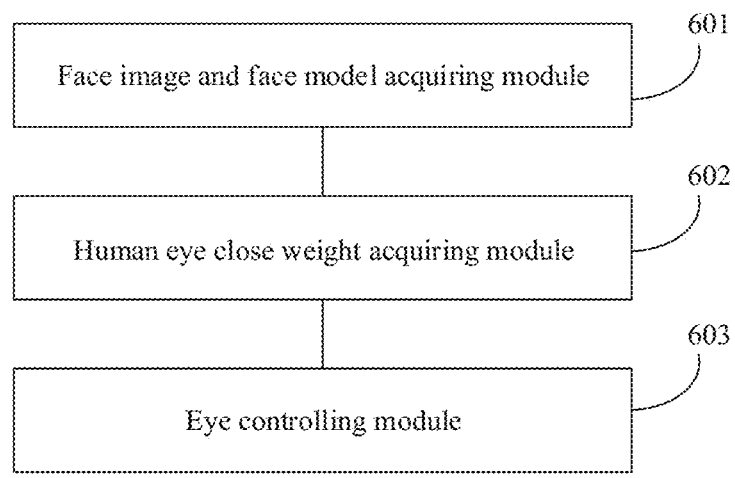
FIG. 6 is a structural block diagram of an apparatus for controlling eyes according to a sixth embodiment of the present disclosure.

FIG. 6 is a structural block diagram of an apparatus for controlling eyes according to a sixth embodiment of the present disclosure. The apparatus may specifically include: a face image and face model acquiring module 601, configured to acquire a face image and a face model; a human eye close weight acquiring module 602, configured to acquire a human eye close weight in the face image, wherein the human eye close weight is configured to measure a human eye close degree; and an eye controlling module 603, configured to control an eye in the face model based on the human eye close weight. The human eye close weight is determined by the apparatus for determining human eye close degrees according to the fifth embodiment of the present disclosure.

In some embodiments, the eye controlling module 603 includes: a predetermined human open amplitude acquiring sub-module, configured to acquire a predetermined human eye open amplitude in the initial face model; a target human eye open amplitude calculating sub-module, configured to calculate a target human eye open amplitude based on the human eye close weight and the predetermined human eye open amplitude; and an adjusting sub-module, configured to adjust the human eye open amplitude in the initial face model to the target human eye open amplitude.

In some embodiments, the target human eye open amplitude calculating sub-module includes a target human eye open amplitude determining unit, configured to determine that the target human eye open amplitude is 0 in the case that the human eye close weight is greater than a predetermined value.

The apparatus for controlling eyes according to the embodiment of the present disclosure may perform the method for controlling eyes according to Embodiment 3 of the present disclosure, and is provided with corresponding functional modules for performing the method.

Seventh Embodiment

Figure 7:
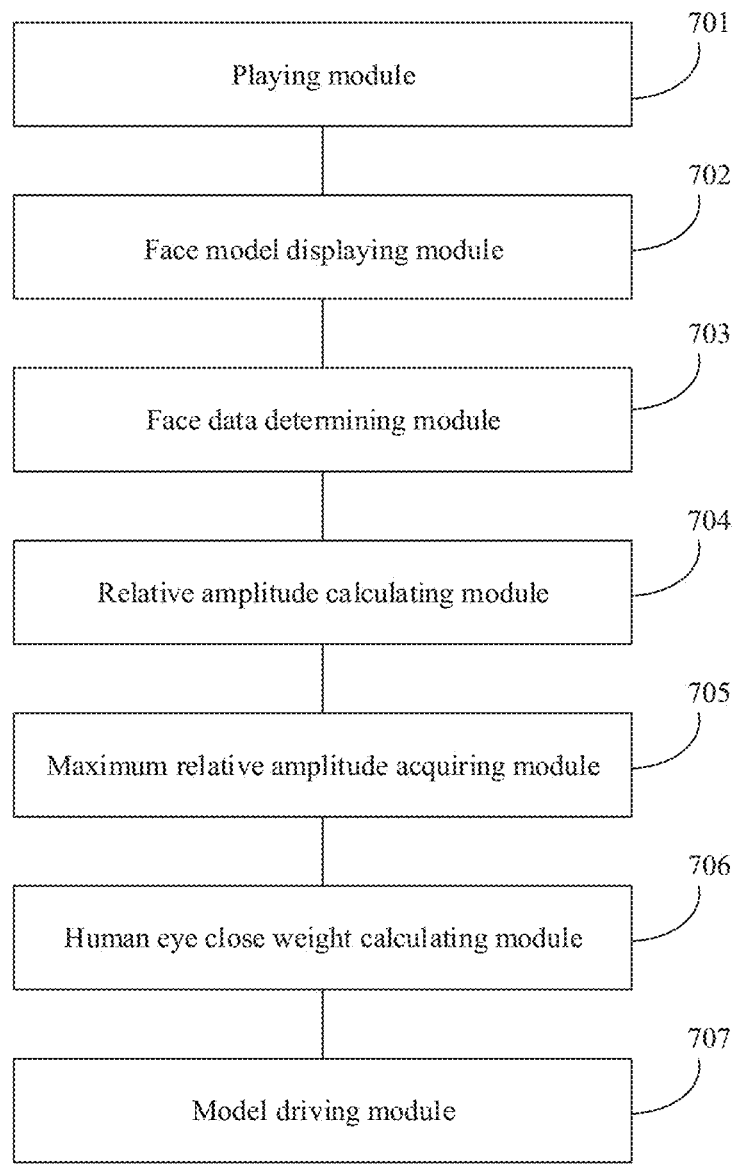
FIG. 7 is a structural block diagram of an apparatus for controlling eyes according to a seventh embodiment of the present disclosure.

FIG. 7 is a structural block diagram of an apparatus for controlling eyes according to a seventh embodiment of the present disclosure. The apparatus may specifically include: a playing module 701, configured to play video data including a plurality of frames of image data, wherein the image data includes a face image; a face model displaying module 702, configured to display a face model to cover the face image; a face data determining module 703, configured to determine a human eye open amplitude and a reference distance in the face image of each of the frames; a relative amplitude calculating module 704, configured to calculate a relative amplitude of the human eye open amplitude relative to the reference distance; a maximum relative amplitude acquiring module 705, configured to acquire a maximum relative amplitude; a human eye close weight calculating module 706, configured to calculate a human eye close weight in the face image based on the relative amplitude and the maximum relative amplitude; and a model driving module 707, configured to drive, based on the human eye close weight, an eye in the face model to blink.

In some embodiments, the maximum relative amplitude acquiring module 705 includes: a relative amplitude acquiring sub-module, configured to acquire relative amplitudes of the human eye open amplitudes relative to the reference distances in the plurality of frames of face images; and a maximum relative amplitude determining sub-module, configured to identify a maximum value from the plurality of relative amplitudes and determine the maximum value as the maximum relative amplitude.

The apparatus for controlling eyes according to the embodiment of the present disclosure can perform the method for controlling eyes according to the fourth embodiment of the present disclosure, and is provided with corresponding functional modules for performing the method.

Eighth Embodiment

Figure 8:
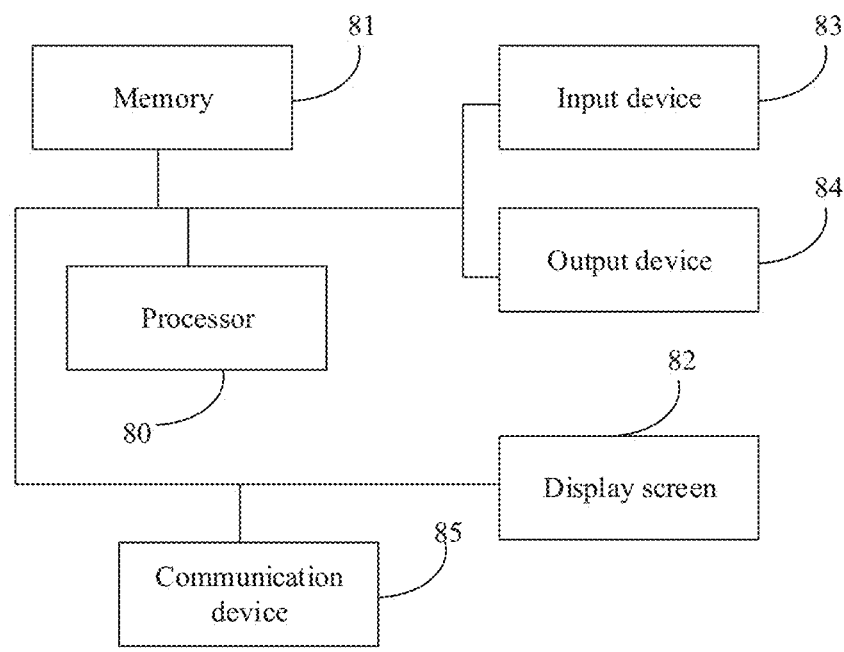
FIG. 8 is a structural block diagram of a device according to an eighth embodiment of the present disclosure.

FIG. 8 is a schematic structural diagram of a device according to an embodiment of the present disclosure. As shown in FIG. 8, the device includes: a processor 80, a memory 81, a display screen 82 with a touch function, an input device 83, an output device 84 and a communication device 85. The number of the processors 80 in the device may be at least one. In FIG. 8, one processor 80 is taken as an example. The number of the memories 81 in the device may be at least one. In FIG. 8, one memory 81 is taken as an example. The processor 80, the memory 81, the display screen 82, the input device 83, the output device 84, and the communication device 85 of the device may be connected by a bus or other means. In FIG. 8, the connection by a bus is taken as an example.

As a computer-readable storage medium, the memory 81 is configured to store software programs, computer-executable programs, and modules, such as program instructions/modules (e.g., the face image acquiring module 501, the face data determining module 502, the relative amplitude calculating module 503, the maximum relative amplitude acquiring module 504 and the human eye close weight calculating module 505 in the apparatus for determining human eye close degrees) corresponding to the method for determining human eye close degrees according to Embodiment 1 or 2 of the present disclosure, or program instructions/modules (e.g., the face image and face model acquiring module 601, the human eye close weight acquiring module 602 and the eye controlling module 603 in the apparatus for controlling eyes) corresponding to the method for controlling eyes according to Embodiment 3 of the present disclosure, or program instructions/modules (e.g., the playing module 701, the face model displaying module 702, the face data determining module 703, the relative amplitude calculating module 704, the maximum relative amplitude acquiring module 705, the human eye close weight calculating module 706 and the model driving module 707 in the apparatus for controlling eyes) corresponding to the method for controlling eyes according to Embodiment 4 of the present disclosure. The memory 81 may mainly include a program storage region and a data storage region. The program storage region may store an operation apparatus, and an application program required by at least one function. The data storage region may store data created based on the use of the device, and the like. In addition, the memory 81 may include a high-speed random access memory, and may further include a non-volatile memory, such as at least one magnetic disk storage device, a flash memory device, or other non-volatile solid-state storage devices. In some examples, the memory 81 further includes memories which are remotely disposed corresponding to the processor 80, and these remote memories may be connected to the device via networks. Examples of the networks include, but are not limited to, Internet, an intranet, a local area network, a mobile communication network, and combinations thereof.

The display screen 82 is a display screen 82 with a touch function. The display screen 82 may be a capacitive screen, an electromagnetic screen or an infrared screen. In general, the display screen 82 is configured to display data based on instructions of the processor 80, and is further configured to receive touch operations on the display screen 82 and send corresponding signals to the processor 80 or other devices. In an exemplary embodiment, in the case that the display screen 82 is an infrared screen, the display screen 82 further includes an infrared touch frame. The infrared touch frame is disposed around the display screen 82. In this case, the display screen 82 is configured to receive an infrared signal and send the infrared signal to the processor 80 or other devices.

The communication device 85 is configured to establish a communication connection with other devices. The communication device 85 may be a wired communication device and/or a wireless communication device.

The input device 83 is configured to receive input digital or character information, and generate key signal input related to user settings and function control of the device. The input device 83 is further configured as a camera to capture images and a sound pickup device to capture audio data. The output device 84 may include audio devices such as a loudspeaker. The composition of the input device 83 and the output device 84 may be set according to actual conditions.

The processor 80 is configured to run various functional applications and perform data processing of the device by running software programs, instructions and modules, which are stored in the memory 81, so as to realize the method for determining human eye close degrees and/or the method for controlling eyes.

In this embodiment, the processor 80 is configured to perform the method for determining human eye close degrees and/or the method for controlling eyes according to the embodiments of the present disclosure in the case of running one or more programs stored in the memory 81.

An embodiment of the present disclosure further provides a computer-readable storage medium. The storage medium, when an instruction stored in the storage medium run by a processor of a device, causes the device to perform the method for determining human eye close degrees and/or the method for controlling eyes according to the above method embodiments.

For the apparatus, device, and storage medium embodiments, the description thereof is relatively simple since they are basically similar to the method embodiments, and related parts thereof may be found in the partial description of the method embodiments.

Based on the above description of the embodiments, those skilled in the art can clearly know that the present disclosure may be practiced by software and necessary general-purpose hardware, or by hardware, wherein the former is the better implementation in many cases. Based on such understanding, technical solutions of the present disclosure may be embodied in the form of a software product. The computer software product may be stored in a computer-readable storage medium, such as a computer floppy disk, a read-only memory (ROM), a random access memory (RAM), a flash memory (FLASH), a hard disk, an optical disk, or the like. The computer software product includes a plurality of instructions configured to enable a computer device (which may be a robot, a personal computer, a server, a network device, or the like) to perform the method for determining human eye close degrees and/or the method for controlling eyes according to any embodiment of the present disclosure.

It should be noted that the all units and modules included in the apparatus for determining human eye close degrees and/or the apparatus for controlling eyes are only divided according to functional logic, but are not limited to the above division as long as the corresponding function can be realized. In addition, the names of each functional unit are only for distinguishing each other, and are not intended to limit the protection scope of the present disclosure.

It should be understood that various portions of the present disclosure may be practiced by hardware, software, firmware, or combinations thereof. In the above embodiments, a plurality of processes or methods may be performed by software or firmware that are stored in the memory and executed by a suitable instruction execution system. For example, during practice with hardware, as in another embodiment, the portions of the present disclosure may be practiced by using any one or a combination of the following techniques well known in the art: a discrete logic circuit including a logic gate circuit for implementing logic functions of data signals, a specific-purpose integrated circuit a suitable combinational logic gate circuit, a programmable gate array (PGA), a field programmable gate array (FPGA), and the like.

What is claimed is:
1. A method for controlling eyes in a face model and performed by a hardware device, comprising:
  acquiring a face image and the face model;
  determining a human eye open amplitude and a reference distance in the face image;
  calculating a relative amplitude of the human eye open amplitude relative to the reference distance;
  acquiring a maximum relative amplitude;
  calculating a human eye close weight in the face image based on the relative amplitude and the maximum relative amplitude; and
  controlling an eye in the face model based on the human eye close weight.
2. The method according to claim 1, wherein controlling the eye in the face model based on the human eye close weight comprises:
  acquiring a predetermined human eye open amplitude in the face model;
  calculating a target human eye open amplitude based on the human eye close weight and the predetermined human eye open amplitude; and
  adjusting the human eye open amplitude in the face model to the target human eye open amplitude.
3. The method according to claim 2, wherein calculating the target human eye open amplitude based on the human eye close weight and the predetermined human eye open amplitude comprises:
  determining that the target human eye open amplitude is 0 in response to the human eye close weight being greater than a predetermined value.
4. A non-transitory computer-readable storage medium storing a computer program therein, wherein the computer program, when run by a processor, causes the processor to perform the method for controlling eyes as defined in claim 1.
5. A device for controlling eyes, comprising:
  at least one processor; and
  a storage device storing at least one program therein,
  wherein the at least one program, when run by the at least one processor, causes the at least one processor to perform the method for controlling eyes as defined in claim 1.
6. A method for controlling eyes, comprising:
  playing video data comprising a plurality of frames of image data, the image data comprising a face image;
  displaying a face model to cover the face image;
  determining a human eye open amplitude and a reference distance in the face image of each of the plurality of frames;
  calculating a relative amplitude of the human eye open amplitude relative to the reference distance;
  acquiring a maximum relative amplitude;
  calculating a human eye close weight in the face image based on the relative amplitude and the maximum relative amplitude; and
  driving, based on the human eye close weight, an eye in the face model to blink.
7. The method according to claim 6, wherein acquiring the maximum relative amplitude comprises:
  acquiring a plurality of relative amplitudes of human eye open amplitudes relative to the reference distance in the plurality of frames of face images; and
  determining a maximum value from the plurality of relative amplitudes, and determining the maximum value as the maximum relative amplitude.
8. A non-transitory computer-readable storage medium storing a computer program therein, wherein the computer program, when run by a processor, causes the processor to perform the method for controlling eyes as defined in claim 6.

9. A device for controlling eyes, comprising:
at least one processor; and
a storage device storing at least one program therein,
wherein the at least one program, when run by the at least one processor, causes the at least one processor to perform the method for controlling eyes as defined in claim 6.

10. The method according to claim 6, wherein determining the human eye open amplitude and the reference distance in the face image comprises:
acquiring face key points by performing a face key point detection on the face image;
identifying human eye key points and reference key points from the face key points;
calculating the human eye open amplitude based on the human eye key points; and
calculating the reference distance based on the reference key points.

11. The method according to claim 10, wherein identifying the human eye key points from the face key points comprises:
identifying eye key points from the face key points; and
selecting an eye top key point and an eye bottom key point from the eye key points as the human eye key points.

12. The method according to claim 10, wherein the human eye key points comprise an eye top key point and an eye bottom key point, and calculating the human eye open amplitude based on the human eye key points comprises:
calculating a distance between the eye top key point and the eye bottom key point, and determining the distance as the human eye open amplitude.

13. The method according to claim 10, wherein identifying the reference key points from the face key points comprises:
identifying nose key points from the face key points; and
selecting a nose top key point and a nose tip key point from the nose key points as the reference key points.

14. The method according to claim 10, wherein the reference key points comprise a nose top key point and a nose tip key point, and calculating the reference distance based on the reference key points comprises:
calculating a distance between the nose top key point and the nose tip key point, and determining the distance as the reference distance.

15. The method according to claim 6, wherein calculating the human eye close weight in the face image based on the relative amplitude and the maximum relative amplitude comprises:
acquiring a human eye close amplitude by calculating a ratio of the relative amplitude to the maximum relative amplitude, the human eye close amplitude being positively correlated with the relative amplitude and negatively correlated with the maximum relative amplitude; and
calculating the human eye close weight by using the human eye close amplitude and a predetermined human eye close constant.

\* \* \* \* \*